(12) United States Patent
Paterik (10) Patent No.: US 7,751,384 B1
(45) Date of Patent: Jul. 6, 2010

(54) METHOD AND SYSTEM FOR IDENTIFYING CALLS

(75) Inventor: Thomas L. Paterik, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1385 days.

(21) Appl. No.: 10/453,248

(22) Filed: Jun. 3, 2003

(51) Int. Cl.
| | |
|---|---|
| H04L 12/66 | (2006.01) |
| H04M 1/64 | (2006.01) |
| H04M 15/00 | (2006.01) |
| H04M 3/00 | (2006.01) |
| H04M 5/00 | (2006.01) |

(52) U.S. Cl. .................... 370/352; 379/88.19; 379/120; 379/121.04; 379/245

(58) Field of Classification Search ................. 370/352, 370/356, 395.52, 255, 280, 385; 379/126, 379/245, 88.17, 142.04, 88.19, 121.04, 120, 379/112.06, 189, 352; 455/18, 403, 406; 709/22
See application file for complete search history.

(56) References Cited

U.S. PATENT DOCUMENTS

| | | | | |
|---|---|---|---|---|
| 5,613,201 | A * | 3/1997 | Alford et al. ................... | 455/18 |
| 5,781,855 | A * | 7/1998 | Reuhkala et al. ............. | 455/403 |
| 5,809,121 | A | 9/1998 | Elliott et al. | |
| 6,070,076 | A | 5/2000 | Valentine | |
| 6,298,127 | B1 * | 10/2001 | Petrunka ..................... | 379/126 |
| 6,333,931 | B1 * | 12/2001 | LaPier et al. ................. | 370/385 |
| 6,393,112 | B1 | 5/2002 | Gottlieb et al. | |
| 6,526,043 | B1 * | 2/2003 | Fogelholm et al. .......... | 370/352 |
| 6,683,870 | B1 * | 1/2004 | Archer ....................... | 370/356 |
| 6,694,001 | B1 * | 2/2004 | Lampell et al. ............. | 379/189 |
| 6,721,284 | B1 * | 4/2004 | Mottishaw et al. .......... | 370/255 |
| 6,757,275 | B2 * | 6/2004 | Sorrentino ................... | 370/352 |
| 6,792,089 | B2 * | 9/2004 | Tiliks et al. ................. | 379/126 |
| 6,891,938 | B1 * | 5/2005 | Scott et al. ............. | 379/112.06 |
| 6,970,543 | B2 * | 11/2005 | Lautenschlager et al. ..................... | 379/142.04 |
| 7,002,952 | B2 * | 2/2006 | Jones ......................... | 370/352 |
| 7,298,832 | B2 * | 11/2007 | Lang et al. ................... | 379/137 |
| 7,333,445 | B2 * | 2/2008 | Ilan et al. .................... | 370/280 |
| 2002/0127995 | A1 * | 9/2002 | Faccinn et al. ............. | 455/406 |
| 2002/0176547 | A1 * | 11/2002 | Jones ....................... | 379/88.17 |
| 2002/0194331 | A1 * | 12/2002 | Lewis et al. ................. | 709/224 |
| 2003/0165222 | A1 | 9/2003 | Syrjala et al. | |
| 2004/0028057 | A1 * | 2/2004 | Benjamin et al. ...... | 370/395.52 |

FOREIGN PATENT DOCUMENTS

| | | |
|---|---|---|
| WO | WO 01/15487 A1 | 3/2001 |
| WO | WO 01/91445 A1 | 11/2001 |

OTHER PUBLICATIONS

"Packet Telephony: Long Distance Service for ISPs," Technical Service Description, Cisco Systems, pp. 1-16,1999.
F. Anderson, Request for Comments 3435, Media Gateway Control Protocol (MGCP), pp. 1-157, Verson 1.0, Jan. 2003.

* cited by examiner

Primary Examiner—Thjuan K Addy (57) ABSTRACT

A call is established between a circuit-switched network element and a packet-switched network element. A first call record is generated to record the circuit switched network element's involvement in the call, and a second call record is generated to record the packet-switched network element's involvement in the call. The first and second call records include the same internetwork call identifier to identify the call. The first and second call records are stored, e.g., in a centralized call record repository. Call records for a given call can be retrieved based on the internetwork call identifier for the given call.

23 Claims, 4 Drawing Sheets

METHOD AND SYSTEM FOR IDENTIFYING CALLS

BACKGROUND

1. Field of the Invention

The present invention relates to telecommunications and, more particularly, to methods and systems for identifying calls.

2. Description of Related Art

A telecommunications network element, such as a central office switch, typically generates a call detail record (CDR) for each call in which the network element is involved. A CDR typically records information about the call, such as calling number, called number, and time information, that a telecommunications service provider may use for billing or other purposes. In many cases, multiple network elements are involved in a given call, e.g., an originating switch and a terminating switch, with the result that multiple CDRs are generated for the call. Although it may be desirable to refer to all of the CDRs generated for a given call, because many different network elements may generate CDRs for many different calls, it may be difficult to determine which CDRs generated by different network elements relate to the same call. The problem may be even more complicated if the call is an internetwork call, wherein different networks carry different legs or segments of the call.

Accordingly, there is a need to provide methods and systems for identifying calls, e.g., in order to facilitate determination of which call detail records relate to the same call.

SUMMARY

In a first principal aspect, an exemplary embodiment of the present invention provides a method of identifying a call. At least a circuit-switched network element and a packet-switched network element are involved in the call. In accordance with the method, a first call record indicating involvement in the call by the circuit-switched network element is generated. The first call record includes an internetwork call identifier to identify the call. A second call record indicating involvement in the call by the packet-switched network element is generated. The second call record also includes the internetwork call identifier to identify the call.

In a second principal aspect, an exemplary embodiment of the present invention provides a system for managing call records. The system comprises at least one call record repository and a retrieval application. The at least one call record repository stores call records, including circuit-switched call records associated with at least one circuit-switched network element and packet-switched call records associated with at least one packet-switched network element. Distinct calls are identified in the call records by distinct internetwork call identifiers. The retrieval application retrieves at least one call record from the at least one call record repository based on at least one parameter. The at least one parameter includes one of the distinct call identifiers.

DETAILED DESCRIPTION OF EXEMPLARY EMBODIMENTS

The present invention, in exemplary embodiments, provides methods and systems that use internetwork call identifiers to identify calls, including internetwork calls that have one or more call legs in a circuit-switched network and one or more call legs in a packet-switched network. The internetwork call identifier for a call may be included in call records, such as call detail records (CDRs), that are generated for the call by or on behalf of network elements involved in the call. The network elements involved in a call may include (i) circuit-switched network elements, such as service switching points (SSPs), mobile switching centers (MSCs), and intelligent peripherals, (ii) packet-switched network elements, such as voice-over-packet (VoP) gateways and service nodes, and (iii) gateways between the circuit-switched and packet-switched networks, such as media gateways.

The call records may be stored for a period of time, e.g., in repositories of the network elements that generated the call records and/or in a centralized call record repository. The internetwork call identifiers in the call records may then be used to determine which call records relate to a particular call, e.g., for billing or call tracing purposes. For example, the present invention may provide a retrieval application that can search for and retrieve call records that include the internetwork call identifier for a particular call.

In an exemplary embodiment, the internetwork call identifier for a given call may be included in signaling messages used to set up the call. For example, a first, originating network element may assign an internetwork call identifier for the call when the call is originated. The first, originating network element may then include the internetwork call identifier in one or more signaling messages used to route the call to the second network element involved in the call. The second network element may then include the internetwork call identifier in one or more signaling messages used to route the call to the third network element involved in the call, and so on. In this way, each network element involved in a call can identify the call by the same internetwork call identifier, e.g., for purposes of generating call records or for other purposes. Then, either when the call is still ongoing or after the call is over, a retrieval application may be used to retrieve the call records for the call by retrieving call records that include the internetwork call identifier for the call.

1. Exemplary Network Architecture

Figure 1:
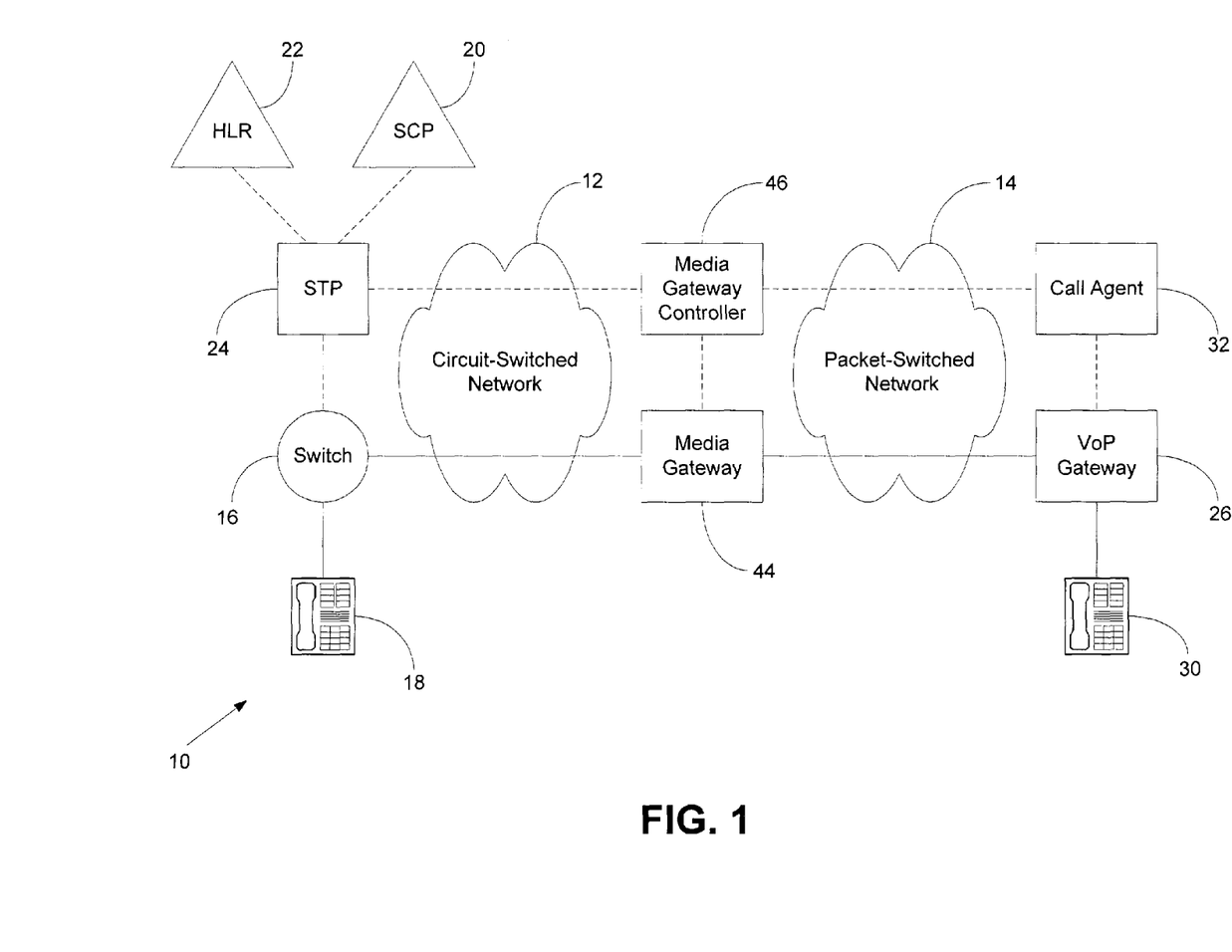
FIG. 1 is a simplified block diagram of a first telecommunications system illustrating a first internetwork call, in accordance with an exemplary embodiment of the present invention.
Figure 2:
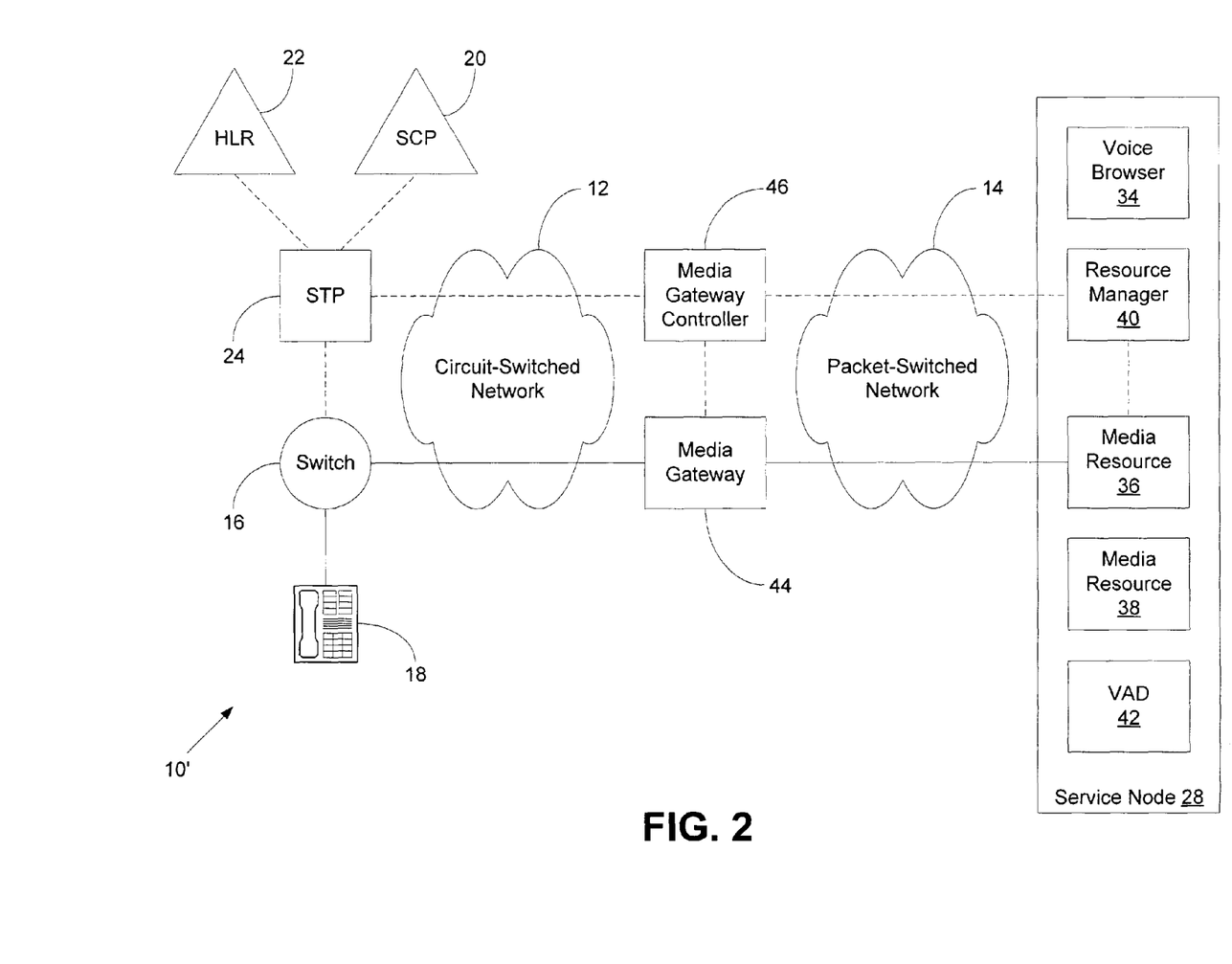
FIG. 2 is a simplified block diagram of a second telecommunications system illustrating a second internetwork call, in accordance with an exemplary embodiment of the present invention.

Referring to the drawings, FIG. 1 is a simplified block diagram of a first exemplary telecommunications system 10 illustrating a first exemplary internetwork call, and FIG. 2 is a simplified block diagram of a second exemplary telecommunications system 10' illustrating a second exemplary internetwork call. In FIGS. 1 and 2, bearer channels that carry primarily the voice or other media exchanged in the calls are indicated by solid lines, and signaling channels that carry primarily the signaling messages used to set up, tear down, control, or monitor the calls are indicated by dashed lines.

Telecommunications system 10 includes a circuit-switched network 12, such as the public switched telephone network (PSTN), and a packet-switched network 14. In circuit-switched network 12, media is carried by dedicated circuits, such as trunks, and may be carried in a digital format, such as a pulse code modulation (PCM) format. Various circuit-switched network elements, such as service switching points (SSPs), mobile switching centers (MSCs), and other switching systems (exemplified in FIG. 1 by switch 16) may be used to route calls through circuit-switched network 12. Other circuit-switched network elements, such as intelligent peripherals, interactive voice response (IVR) systems, and voice mail systems, may interact with calls in circuit-switched network 12. Other circuit-switched network elements may participate in calls in other ways.

Various telephony devices, such as landline telephones, wireless telephones, fax machines, and/or modems, may be communicatively coupled to switch 16 so as to be able to send and receive calls via circuit-switched network 12. FIG. 1 shows a telephone 18 to represent the various telephony devices that may be communicatively coupled to switch 16. It is to be understood that telephone 18 may be communicatively coupled to switch 16 via one or more intermediate systems. For example, if telephone 18 is wireless then telephone 18 may be communicatively coupled to switch 16 (which may be an MSC) via a radio access network. The radio access network may include, for example, base transceiver stations (BTSs) and base station controllers (BSCs).

Circuit-switched network elements, such as switch 16, may use an out-of-band signaling system, such as Signaling System 7 (SS7), to route calls through circuit-switched network 12. Circuit-switched network elements, such as switch 16, may also engage in other types of signaling with various call control systems, such as service control point (SCP) 20 and/or home location register (HLR) 22. For example, to support communications with wireless telephones, switch 16 may engage in IS-771 signaling with SCP 20 and/or IS-41 signaling with HLR 22. The SS7 and/or other signaling may be carried by signal transfer points (STPs), such as STP 24. Thus, switch 16 may engage in signaling with SCP 20, HLR 22, and/or other network elements, via STP 24.

Packet-switched network 14, which may include one or more local area networks (LANs) and/or one or more wide area networks (WANs), such as the Internet, routes packets based on network addresses, such as by using the Internet Protocol (IP) protocol in combination with the User Datagram Protocol (UDP) or Transmission Control Protocol (TCP). The IP packets may be carried over lower level protocols, such as asynchronous transfer mode (ATM) protocols. In addition, higher-level applications and protocols, such as the Session Initiation Protocol (SIP) and the HyperText Transfer Protocol (HTTP), may be carried as UDP/IP or TCP/IP packets in packet-switched network 14. Relevant aspects of SIP are described in Rosenberg, et al., "SIP: Session Initiation Protocol," Request for Comments 3261 (June 2002), which is incorporated herein by reference. A recent version of HTTP is described in "Hypertext Transfer Protocol—HTTP/1.1," Request for Comments 2616 (June 1999), which is incorporated herein by reference. Voice or other media may be carried in packet-switched network 14 in a real-time packet media format, e.g., by using the real-time transport protocol (RTP). Relevant aspects of RTP are described in Schulzrinne, et al., "RTP: A Transport Protocol for Real-Time Applications," Request for Comments 1889 (January 1996), which is incorporated herein by reference.

Various packet-switched network elements, such as voice-over-packet (VoP) gateways and service nodes may be involved in calls via packet-switched network 14. For example, FIG. 1 shows a VoP gateway 26 involved in a call, and FIG. 2 shows a service node 28 involved in a call. VoP gateway 26 could be any gateway that communicates voice or other media in a packetized form via packet-switched network 14. For example, VoP gateway 26 could be an Internet Protocol capable private branch exchange ("IP-PBX"). As another example, VoP gateway could comprise a media terminal adaptor coupled to a broadband network access device, such as a cable modem.

Various communication devices, such as analog telephones, IP telephones, personal computers equipped with microphones and speakers, and/or wireless communication devices may be communicatively coupled to VoP gateway 26 so as to be able to send and receive calls via packet-switched network 14. FIG. 1 shows a telephone 30 to represent the various communication devices that may be communicatively coupled to VoP gateway 26. It is to be understood that telephone 30 may be communicatively coupled to VoP gateway 26 via one or more intermediate systems. For example, if telephone 30 is a wireless device then telephone 30 may be communicatively coupled to VoP gateway 26 via a wireless access point.

VoP gateway 26 may be controlled via packet-switched network 14 by other network elements, such as a call agent 32. In particular, the signaling used to set up, tear down, control, and/or monitor calls to or from VoP gateway 26 may go through call agent 26. In an exemplary embodiment, SIP is used for such signaling. However, other protocols, such as H.323, could be used. If SIP is used, then VoP gateway 26 may include a SIP user agent to originate and terminate calls on behalf of telephone 30, and call agent 32 may function as a SIP proxy server.

FIG. 2 illustrates an exemplary internetwork call in which service node 28 is involved. Service node 28 may be involved in the call in order to provide one or more interactive media services to the caller. The interactive media services may involve audio, such as receiving speech or DTMF tones from the caller and/or transmitting speech to the caller. The interactive media services may also involve video and/or other media. In some cases, the interactive media services may be multi-modal, i.e., may involve different media types. For example, a caller may transmit speech, and the interactive media service may respond with graphics. The interactive media services may also involve voice activated dialing (VAD), voice Web browsing, data exchange, and/or handwriting recognition.

Service node 28 may have access to a plurality of different interactive applications to provide a plurality of different interactive media services to the caller. The interactive applications may be associated with uniform resource locators (URLs). For example, service node 28 may include a voice browser 34 that obtains an interactive application, e.g., in the form of a VXML document, by sending an HTTP GET request to the URL associated with the interactive application. Voice browser 34 may then interpret the VXML document to determine how to provide the interactive media service to the caller.

Service node 28 includes one or more media resources that may interact with the caller to provide interactive media services. For example, FIG. 2 shows service node 28 with media resources 36 and 38, which may be automatic speech recognition (ASR) engines, text-to-speech (TTS) engines, or other media resources. Media resources 36 and 38 may exchange media with the caller using RTP and/or other protocols. Service node 28 may also include a resource manager 40 that controls media resources 36 and 38, e.g., in accordance with a VXML document interpreted by voice browser 34. During a given call, the caller may communicate with different media resources in service node 28 at different times. For example, to provide speech specified by text, resource manager 40 may involve media resource 36 in the call and, later, to provide speech recognition, resource manager 40 may involve media resource 38 in the call. Resource manager 40 may also engage in signaling, e.g., using SIP, to set up calls to service node 28.

Callers may also be able to interact with other sub-elements of service node 28, e.g., via media resources 36 and 38. For example, callers may be able to use voice browser 34 to engage in Web browsing. In addition, service node 28 may include a voice activated dialer (VAD) 42 with which a caller may use to originate a call to a telephone number spoken by the caller. In this way, a caller may be able to call service node 28 and then use VAD 42 to originate one or more additional calls from service node 28. The additional calls may be intranetwork calls carried by packet-switched network 14 only, or they may be internetwork calls that have one or more call legs carried by circuit-switched network 12. Thus, additional network elements, such as VoP gateways, media gateways, and switches, may be involved in calls originating from service node 28 by means of VAD 42.

Although FIG. 2 shows service node 28 with two media resources, one voice browser, and one VAD, service node 28 may have a greater or fewer number of these sub-elements. In addition, service node 28 may include other components and may have a distributed architecture. Additional details regarding an exemplary embodiment of service node 28 are provided in U.S. patent application Ser. No. 10/414,545, titled "Distributed Interactive Media System and Method," filed Apr. 15, 2003, which is incorporated herein by reference.

Communications between circuit-switched network 12 and packet-switched network 14 are enabled by one or more gateways, such as a media gateway 44. Media gateway 44 converts the media conveyed in calls between the different media formats used in circuit-switched network 12 and packet-switched network 14. For example, media gateway 44 may convert between a PCM format used in circuit-switched network 12 and a real-time packet format, e.g., in accordance with RTP, used in packet-switched network 14.

Media gateway 44 may be controlled by other network elements, such as a media gateway controller 46. In particular, media gateway controller 46 may engage in signaling via circuit-switched network 12 and packet-switched network 14 to set up calls through media gateway 44. For example, to set up a call from a circuit-switched network element, such as switch 16, to a packet-switched network element, such as VoP gateway 26 or service node 28, media gateway controller 46 may receive SS7 signaling from circuit-switched network 12 and then engage in SIP signaling via packet-switched network 14. If the signaling to set up the call is successful, media gateway controller 46 may then control media gateway 44 so that media gateway 44 converts the media exchanged in the call.

In the internetwork call illustrated in FIG. 1, i.e., the call from telephone 18 to telephone 30, circuit-switched network 12 conveys the media in the call between switch 16 and media gateway 44, and packet-switched network 14 conveys the media in the call between media gateway 44 and VoP gateway 26. Other network elements, such as STP 24, media gateway controller 46, and call agent 32 may be involved in the signaling used to establish the call. In the internetwork call illustrated in FIG. 2, i.e., the call from telephone 18 to service node 28, circuit-switched network 12 conveys the media in the call between switch 16 and media gateway 44, and packet-switched network 14 conveys the media in the call between media gateway 44 and service node 28. Other network elements, such as STP 24 and media gateway controller 46 may be involved in the signaling used to establish the call. It is to be understood that FIGS. 1 and 2 are exemplary only in that internetwork calls may originate from either the circuit-switched side or the packet-switched side and may involve other circuit-switched network and packet-switched elements than shown in FIGS. 1 and 2.

2. Exemplary Method of Call Identification

Figure 3:
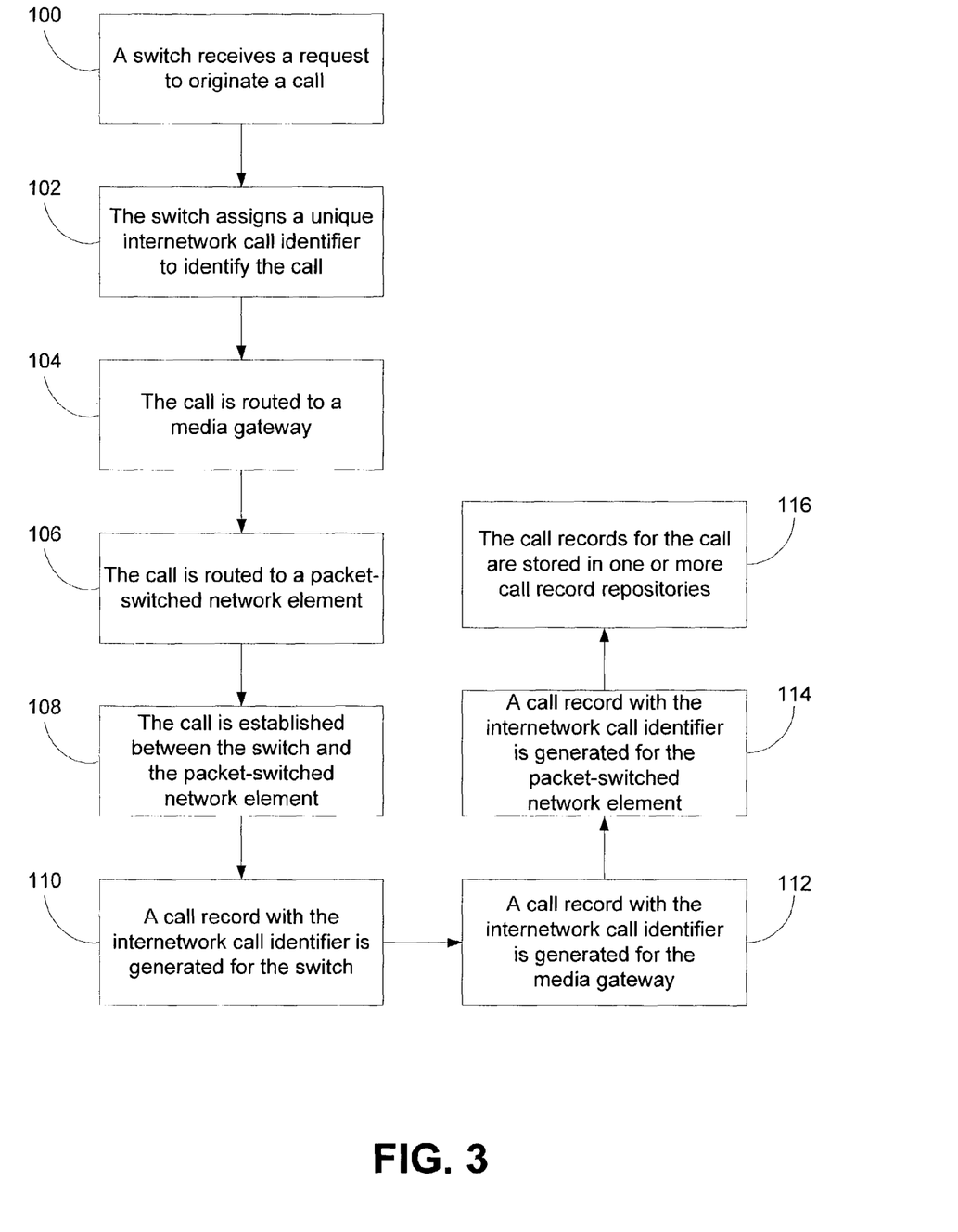
FIG. 3 is a flow chart for a method of call identification, in accordance with an exemplary embodiment of the present invention.

FIG. 3 is a flow chart illustrating an exemplary method of using an internetwork identifier to identify a call. The example illustrated in FIG. 3 is for an internetwork call, i.e., a call that is carried through both circuit-switched network 12 and packet-switched network 14, that originates from the circuit-switched side and terminates at the packet-switched side. For example, the call may originate from telephone 18 and terminate at either telephone 30, as in FIG. 1, or service node 28, as in FIG. 2. It is to be understood, however, that an internetwork identifier may also be used to identify internetwork calls that originate from the packet-switched side and terminate at the circuit-switched side or that originate and terminate in one network but pass through another network. In addition, an internetwork identifier may be used to identify intranetwork calls, i.e., calls that stay within circuit-switched network 12 or packet-switched network 14.

The method may begin when switch 16 receives a request to originate a call, e.g., dialed digits from telephone 18, as indicated by step 100. Switch 16 then assigns an internetwork call identifier to identify the call, as indicated by step 102. Switch 16 may assign the internetwork call identifier in different ways. In one approach, each internetwork call identifier is a number (e.g., a 64-bit number) that switch 16 assigns sequentially for each call that switch 16 originates. The number of bits or digits in the internetwork call identifiers may be chosen to be sufficiently high such that switch 16 takes a conveniently long time (e.g., 24 hours to several days) to run through them all given expected call volumes. In this way, the internetwork call identifier, when combined with the time or date of the call and an identification of switch 16, such as a switch identification number (SWID) assigned to switch 16, may uniquely identify the call. In a variation of this approach, the SWID of switch 16 may be included as part of the internetwork call identifier.

Alternatively, other approaches could be used to assign the internetwork call identifier. For example, the internetwork call identifier may be a random number assigned by switch 16. Another possibility is to include a centralized call identifier server that switch 16, and other network elements that may originate calls, may query to obtain internetwork call identifiers. Other approaches could also be used.

In this example, the dialed digits correspond to a directory number assigned to media gateway 44 and associated with a packet-switched network element, such as VoP gateway 26 or service node 28, accessible via media gateway 44. Thus, switch 16 engages in signaling to route the call through circuit-switched network 12 to media gateway 44, as indicated by step 104. For example, switch 16 may engage in SS7 signaling with media gateway controller 46, via STP 24. The SS7 signaling may identify the dialed digits as the called number and may also include certain other information related to the call. For example, the SS7 signaling may include the internetwork call identifier that switch 16 assigned to identify the call. The SS7 signaling may also identify switch 16 (e.g., by SWID) as the originating network element. The SS7 signaling may also include other information.

Media gateway controller 46, in turn, engages in signaling to route the call through packet-switched network 14 to a packet-switched network element associated with the called number, such as VoP gateway 26 or service node 28, as indicated by step 106. For example, to route the call to VoP gateway 26, media gateway controller 46 may engage in SIP signaling with VoP gateway 26 via call agent 32. To route the call to service node 28, media gateway controller 46 may engage in SIP signaling with resource manager 40. The SIP signaling may include the called number and other information related to the call. For example, the SIP signaling may include the internetwork call identifier to identify the call and may identify switch 16 as the originating network element. The SIP signaling may also include other information.

If the signaling to set up the call is successful, then the call is established between switch 16 and the packet-switched network element that was called, e.g., VoP gateway 26 or service node 28, as indicated by step 108. The voice or other media in the call is conveyed between switch 16 and media gateway 44 by circuit-switched network 12, e.g., in a PCM format, and conveyed between media gateway 44 and VoP gateway 26 or service node 28 by packet-switched network 14, e.g., in a real-time packet format.

During the course of the call, call records are generated by, or on behalf of, the various network elements involved in the call. The call records include the internetwork call identifier to identify the call. Thus, a call record with the internetwork call identifier is generated for switch 16, as indicated by step 110. The call record for switch 16 may be generated by switch 16 itself or by another network element, such as SCP 20 or HLR 22, on behalf of switch 16. A call record with the internetwork call identifier is generated for media gateway 44, as indicated by step 112. The call record for media gateway 44 may be generated by media gateway 44 itself or by another network element, such media gateway controller 46, on behalf of media gateway 44. A call record with the internetwork call identifier is generated for the packet-switched network element involved in the call, i.e., VoP gateway 26 or service node 28, as indicated by step 114. The call record for VoP gateway 26 may be generated by VoP gateway 26 itself or by another network element, such as call agent 32, on behalf of VoP gateway 26.

In the case that service node 28 is involved in the call, service node 28 may generate one call record that corresponds to the entire involvement in the call by service node 28. Alternatively, service node 28 may generate multiple call records for the call, with each call record corresponding to a particular period of involvement in the call by a particular sub-element of service node 28, such as media resource 36 or 38 or VAD 42. For example, in a given call service node 28 may use media resource 36 for text-to-speech conversion, then use media resource 38 for speech recognition, and then use media resource 36 again for text-to-speech conversion. To record the involvement of media resources 36 and 38 individually, service node 28 may generate a call record for the first text-to-speech conversion by media resource 36, a call record for the speech recognition by media resource 38, and a call record for the second text-to-speech conversion by media resource 36.

As another example, a caller may use VAD 42 to originate one or more additional calls from service node 28. In that case, service node 28 may generate one or more call records specific for VAD 42 to record this usage. Moreover, service node 28 may use the same internetwork call identifier to identify the call from VAD 42 as used for the original call to service node 28. Thus, in an exemplary embodiment, service node 28 includes the internetwork call identifier in the call record it generates to record the involvement of VAD 42, and service node 28 includes the internetwork call identifier in the signaling used to set up the call placed by VAD 42. In this way, calls originating from service node 28 by means of VAD 42 may be correlated with the original call to service node 28, and may be traced back to the original caller, based on the internetwork call identifier.

The call records generated for the call are stored in one or more call record repositories, as indicated by step 116. In particular, a network element that generates a call record for a call may store the call record in its own call record repository and/or may forward the call record to a centralized call record repository, as described in more detail below.

As noted above, the call records generated in steps 110, 112, and 114 may each include the internetwork call identifier that switch 16 assigned to identify the call. The call records generated in steps 110, 112, and 114 may also include an originating network element identifier, which in this case would identify switch 16. In addition, these call records may include other information. A call record generated for a given network element may include a call record identifier that uniquely identifies the call record among all of the records generated for that network element. A call record generated for a given network element may also identify the network element associated with the call record. Network elements may be identified in the call records in various ways. For example, a circuit-switched network element may be identified by a switch identification (SWID) number. A packet-switched network element may be identified by a network address, such as its IP address, or by some other type of identifier.

A call record generated for a given network element may also include call ingress information, i.e., information regarding how the call got to the network element, and/or call egress information, i.e., information regarding where the network element sent the call. For a circuit-switched network element, the call ingress information may include the trunk group number and port number on which the network element received the call, and the call egress information may include that trunk group number and port number from which the call left the network element. For a packet-switched network element, the call ingress information may include the source IP address and source UDP or TCP port number included in the real-time packets that the network element received for the call, and the call egress information may include the destination IP address and destination UDP or TCP port number included in the real-time packets that the network element transmitted for the call. A call record generated for a media gateway may include call ingress information like that of a circuit-switched network element and call egress information like that of a packet-switched network element if the call originates from the circuit-switched side and may include call ingress information like that of a packet-switched network and call egress information like that of a circuit-switched network if the call originates from the packet-switched side.

A call record for a network element may also include time information regarding the call. Such time information may include, for example, the time that the network element received the call, the time that the network element began processing or handling the call, the time the network element stopped processing or handling the call, and/or the duration of the network element's involvement in the call. A call record may also include other time information regarding the call.

A call record generated for a network element may also include information regarding applications that the network element used in processing the call. Such applications may include, for example, interactive voice applications provided by a circuit-switched network element, such as an IVR, or interactive media services provided by a packet-switched network element, such as service node 28. An application may be identified in a call detail record by an application identification number, by a URL associated with the application, or in other ways.

A call record may also include other information, such as calling number, called number, and/or other information. In addition, call records for different network elements involved in a call may include different types of information. For example, some network elements may include information relating to specific billing policies and/or information specific to certain types of telecommunications service, such as wireless telecommunications service. Some of the information included in the call records generated for a network element, e.g., the internetwork identifier and originating network element identifier, may come from the signaling messages used to route the call to the network element. Alternatively, information included in call records could be obtained in other ways.

3. Exemplary Call Record Management System

Figure 4:
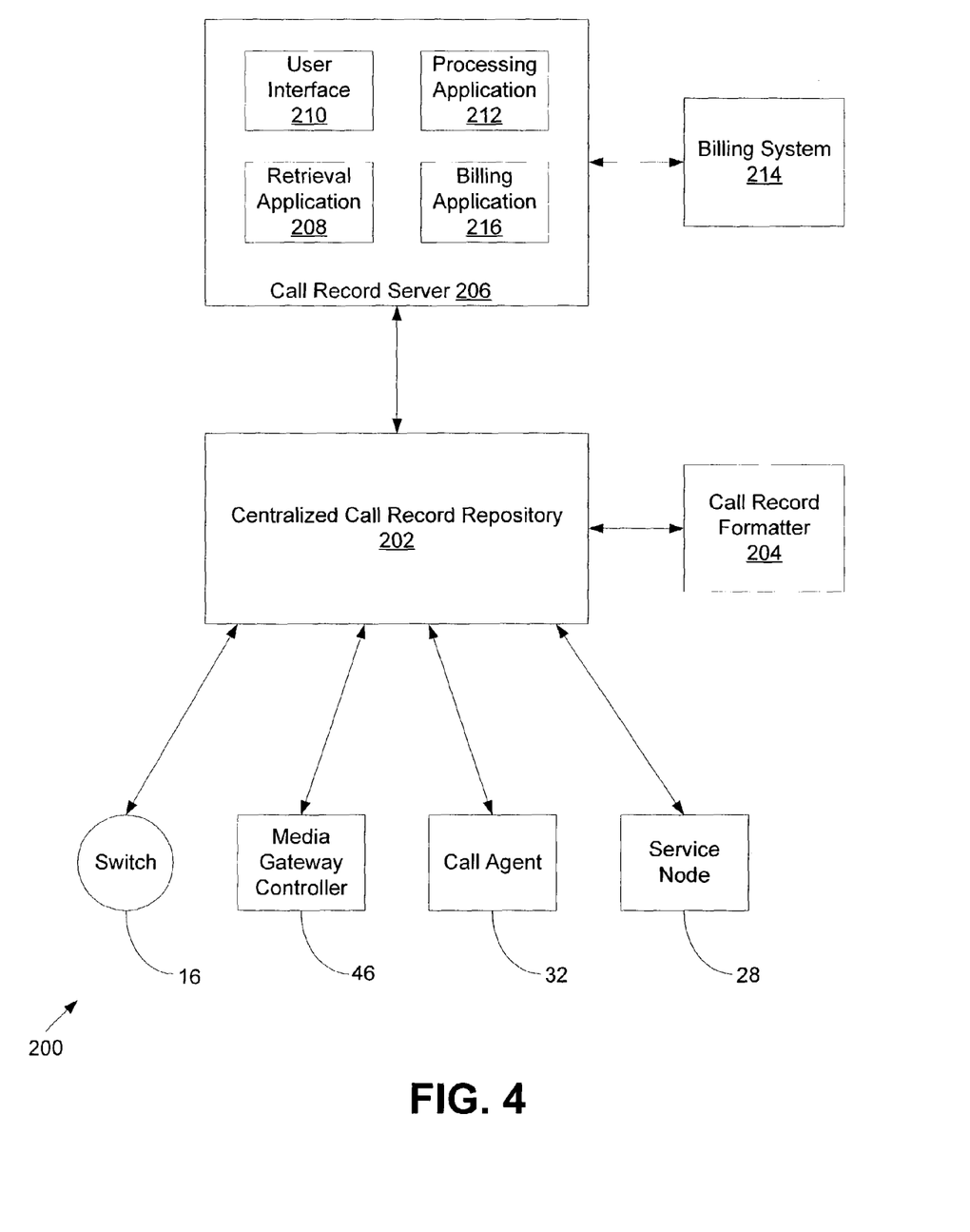
FIG. 4 is a simplified block diagram of a call record management system, in accordance with an exemplary embodiment of the present invention.

FIG. 4 is a simplified block diagram of an exemplary call record management system 200. Call record management system 200 may include a centralized call record repository 202 communicatively coupled to network elements that generate call records, e.g., switch 16, media gateway controller 46, call agent 32, and service node 28. As noted above, network elements that generate call records may forward their call records to centralized call record repository 202 for storage. Alternatively, network elements that generate call records may store their call records in their own call record repositories.

One potential difficulty with storing call records in centralized call record repository 202 is that call records from different network elements may be in different formats. To facilitate handling of call records in different formats, call management system 200 may include a call record formatter 204 that formats the call records into a consistent format for storage in centralized call record repository 202. For example, call record formatter 204 may receive the call records from the network elements such as switch 16, media gateway controller 46, call agent 32, and service node 28, that generated the call records and/or from centralized call record repository 202, and call record formatter 204 may then format the call records and forward the formatted call records to centralized call record repository 202 for storage. Call record formatter 204 may be a separate network element accessible by centralized call record repository 202, as shown in FIG. 4. Alternatively, call record formatter 204 may be an application running on centralized call record repository 204.

Call record management system 200 may also include a call record server 206 communicatively coupled to centralized call record repository 202. Call record server 206 may include a retrieval application 208 that retrieves call records from centralized call record repository 202 and/or network elements, such as switch 16, media gateway controller 46, call agent 32, and service node 28, based on one or more search parameters. Retrieval application 208 may retrieve the call records by querying centralized call record repository 202, by broadcasting queries to several network elements, and/or by querying network elements individually. Retrieval application 208 may retrieve call records for a given call while the call is ongoing, e.g., in real time or near real time, or after the call is over.

The search parameters used by retrieval application 208 may include the internetwork call identifier for a given call. In this way, retrieval application 208 may retrieve all of the call records that include that internetwork call identifier, which, in an exemplary embodiment, may be all of the call records generated for the call. Retrieval application 208 may also retrieve call records based on other search parameters, such as originating network element identifications, time information, application identifications, and/or other information that may be included in call records.

The search parameters used by retrieval application 208 may be based on queries from a user, e.g., for call tracing purposes. In this regard, call record server 206 may include a user interface 210 with which users may pass queries to retrieval application 208 and, thereby, obtain information that may be contained in one or more call records. In some embodiments, user interface 210 may allow authorized users to interact with call record server 206 remotely, e.g., via packet-switched network 14. For example, authorized users may be able interact with user interface 210 using the File Transfer Protocol (FTP), HyperText Transfer Protocol (HTTP), or some other type of database interface protocol.

Call record server 204 may also include a processing application 212 for processing information contained in call records retrieved by retrieval application 208. For example, processing application 212 may format the information in various ways for presentation to the user. In particular, processing application 212 may place the call records into time sequential format or may sort the call records based on one or more sort parameters. Processing application 210 may also chain or correlate call records, e.g., based on internetwork call identifier. After processing, processing application 212 may pass the processed information to user interface 210 for presentation to the user.

Call record management system 204 may also be communicatively coupled to a billing system 214 that calculates charges to users based on information contained in call detail records. To obtain information for billing system 214, retrieval application 208 may periodically retrieve new call records from centralized call record repository 202 and/or other network elements, such as switch 16, media gateway controller 46, call agent 32, and service node 28. Processing application 212 may process the call records retrieved by retrieval application 208 for presentation to billing system 212.

Alternatively, call record server 206 may include a billing application 216 that is dedicated to the retrieval and processing of call records for billing system 214, tasks that are typically done periodically but not in real time. In this way, retrieval application 208 and processing application 212 can be more readily available for call tracing and/or other time-sensitive uses.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method of identifying a call, wherein at least a circuit-switched network element and a packet-switched network element are involved in said call, said method comprising:

in response to a request to originate said call, an originating network element assigning an internetwork call identifier to identify said call;

transmitting said internetwork call identifier between said circuit-switched network element and said packet-switched network element;

generating a first call record that indicates involvement in said call by said circuit-switched network element, said first call record including said internetwork call identifier to identify said call; and generating a second call record that indicates involvement in said call by said packet-switched network element, said second call record including said internetwork call identifier to identify said call.

2. The method of claim 1, wherein said circuit-switched network element is said originating network element, further comprising:

transmitting a signaling message to route said call from said circuit-switched network element, said signaling message including said internetwork call identifier and an originating network element identifier, wherein said originating network element identifier identifies said circuit-switched network element.

3. The method of claim 1, wherein said packet-switched network element is said originating network element, further comprising:

transmitting a signaling message to route said call from said packet-switched network element, said signaling message including said internetwork call identifier and an originating network element identifier, wherein said originating network element identifier identifies said packet-switched network element.

4. The method of claim 1, further comprising:

a media gateway converting media in said call between a first media format used by said circuit-switched network element and a second media format used by said packet-switched network element; and generating a third call record that indicates involvement in said call by said media gateway, said third call record including said internetwork call identifier to identify said call.

5. The method of claim 1, wherein said circuit-switched network element is a service switching point (SSP).

6. The method of claim 1, wherein said circuit-switched network element is a mobile switching center (MSC).

7. The method of claim 1, wherein said packet-switched network element is a voice-over-packet (VoP) gateway.

8. The method of claim 1, wherein said packet-switched network element is a service node including at least one media resource.

9. The method of claim 1, wherein said first call record includes an identifier of said circuit-switched network element.

10. The method of claim 9, wherein said first call record identifies said originating network element for said call.

11. The method of claim 9, wherein said first call record identifies an ingress trunk group carrying said call to said circuit-switched network element.

12. The method of claim 9, wherein said first call record identifies an egress trunk group carrying said call from said circuit-switched network element.

13. The method of claim 1, wherein said second call record includes an identifier of said packet-switched network element.

14. The method of claim 13, wherein said identifier of said packet-switched network element includes an Internet Protocol (IP) address of said packet-switched network element.

15. The method of claim 13, wherein said second call record identifies said originating network element call record for said call.

16. The method of claim 13, wherein said second call record includes a source address of packets that said packet-switched network element received for said call.

17. The method of claim 13, wherein said second call record includes a destination address of packets that said packet-switched network element transmitted for said call.

18. The method of claim 13, wherein said second call record identifies an application that said packet-switched network element used to process said call.

19. The method of claim 18, wherein said second call record includes a Uniform Resource Locator (URL) associated with said application.

20. A system for managing call records, comprising: a record repository for storing call records, wherein said call record repository is communicatively coupled to at least one circuit-switched network element and to at least one packet-switched network element, said call records including circuit-switched call records associated with said at least one circuit-switched network element and packet-switched network call records associated with said at least one packet-switched network element, wherein distinct calls are identified in said call records by distinct internetwork call identifiers; a retrieval application for retrieving call records from said at least one call record repository; and a processing application for correlating, based on internetwork call identifier, call records retrieved by said retrieval application.

21. The call record management system of claim 20, further comprising a call record formatter for formatting call records stored in said call record repository.

22. The call record management system of claim 20, further comprising:

a user interface, coupled to said retrieval application, for receiving requests to retrieve call records.

23. The call record management system of claim 20, further comprising:

a billing application for retrieving and processing call records for a billing system.

* * * * *